(12) United States Patent  
Pucher et al.

(10) Patent No.: US 8,745,839 B2  
(45) Date of Patent: Jun. 10, 2014

(54) METHOD AND APPARATUS FOR INSTALLING A MEASURING TAPE

(75) Inventors: Wolfgang Pucher, Traunstein (DE); Dirk Ahrendt, Grabenstätt-Erlstätt (DE); Stefan Kühnhauser, Waging am See (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 188 days.

(21) Appl. No.: 13/478,435

(22) Filed: May 23, 2012

(65) Prior Publication Data

US 2012/0305695 A1  Dec. 6, 2012

(30) Foreign Application Priority Data

May 31, 2011 (DE) .................. 10 2011 103 739

(51) Int. Cl.  
 *B23P 11/02* (2006.01)
(52) U.S. Cl.  
 USPC .............................. 29/446; 29/466; 29/281.4
(58) Field of Classification Search  
 USPC ............... 29/446, 466, 281.4; 33/552, 555.4; 242/410, 155 R  
 See application file for complete search history.

(56) References Cited

U.S. PATENT DOCUMENTS

| | | | | |
|---|---|---|---|---|
| 854,616 | A * | 5/1907 | Withington | 242/155 R |
| 2,259,202 | A * | 10/1941 | Cooper | 242/604 |
| 2,354,913 | A * | 8/1944 | Gerhard | 242/155 R |
| 5,016,125 | A * | 5/1991 | Takeda et al. | 360/85 |
| 6,098,295 | A | 8/2000 | Feichtinger | |
| 6,523,268 | B1 * | 2/2003 | Boge | 33/1 PT |
| 6,642,048 | B2 * | 11/2003 | Xu et al. | 435/366 |
| 7,032,317 | B2 * | 4/2006 | Hertenberger et al. | 33/1 N |
| 7,290,344 | B2 * | 11/2007 | Brandl et al. | 33/1 PT |
| 8,404,957 | B2 * | 3/2013 | Richards | 84/413 |
| 2002/0083769 | A1 * | 7/2002 | Peterlechner et al. | 73/493 |
| 2004/0211072 | A1 * | 10/2004 | Hertenberger et al. | 33/1 PT |
| 2009/0308475 | A1 * | 12/2009 | Stringfellow et al. | 138/98 |
| 2010/0073816 | A1 * | 3/2010 | Komori et al. | 360/110 |
| 2012/0272541 | A1 * | 11/2012 | Steinich et al. | 33/701 |
| 2013/0139359 | A1 * | 6/2013 | Otten et al. | 24/16 R |

FOREIGN PATENT DOCUMENTS

DE  197 51 019 C2  11/2002

* cited by examiner

*Primary Examiner* — David Bryant  
*Assistant Examiner* — Justin Sikorski  
(74) *Attorney, Agent, or Firm* — Brinks Gilson & Lione

(57) ABSTRACT

A method for installing a measuring tape on a circumferential surface of a holder. The method including wrapping the circumferential surface of the holder with the measuring tape and bracing the measuring tape such that the measuring tape extends spaced apart from the circumference of the holder. When the measuring tape extends spaced from the circumference of the holder due to the bracing, exerting a tensioning force on the measuring tape so that the measuring tape is held with low friction above the circumference, wherein the tensioning force is distributed at least nearly uniformly over the circumference. The method includes undoing the bracing of the measuring tape beginning at a fixation point at which a portion of the measuring tape is affixed to the circumferential surface. The method also includes applying the measuring tape to the circumferential surface of the holder while maintaining the tensioning force.

24 Claims, 11 Drawing Sheets

METHOD AND APPARATUS FOR INSTALLING A MEASURING TAPE

RELATED APPLICATIONS

Applicants claim, under 35 U.S.C. §119, the benefit of priority of the filing date of May 31, 2011 of a German patent application, copy attached, Serial Number 10 2011 103 739.3, filed on the aforementioned date, the entire contents of which is incorporated herein by reference.

BACKGROUND

1. Technical Field

The present invention relates to a method for installing a measuring tape of an angle measuring device, and to an apparatus for performing the method.

The present invention further relates to a structural unit including a measuring tape and an apparatus for installing this measuring tape in accordance with the present invention.

2. Background Information

In angle measuring devices, increasingly there is a need to position a rotating object of relatively large diameter exactly. One example of such an application is large round tables in processing machine, but also telescopes. To enable the most exact possible angular positioning of the round table or telescope, it is known to make a circumferential surface available on the object to be measured and to install a measuring tape with a measurement graduation along the circumference. One simple known way to do this installation is to clamp the measuring tape over the circumference. The measuring tape is firmly restrained on one end, and the remainder of the measuring tape is wrapped around the convex circumferential surface of the object to be measured. By static friction between the circumferential surface and the measuring tape, locally different tension ratios develop in the measuring tape over the circumference. The deviation in the measurement graduation applied to the measuring tape varies along the measuring tape in a manner equivalent to the locally varying tension, which in particular leads to short-period errors in the angle measurement.

In German Patent DE 197 51 019 C2, an installation method and an apparatus are known with which the same tensioning force is introduced at both ends of the measuring tape that attains a reduction in angle error. However, when compared to systems in which only one end of the measuring tape is firmly joined to its underlay, and in the installation operation a tensioning force is exerted on the second end, the tension ratios over the entire circumference, especially with large diameters, are as before still inadequate for precise angle measurements.

OBJECTS AND SUMMARY OF THE INVENTION

An object of the present invention is therefore to disclose a method for installing a measuring tape with which the measuring tape can be installed on a circumferential surface of an object to be measured in such a way that an exact angle measurement over this circumference is made possible.

This object is attained according to the present invention by a method for installing a measuring tape on a circumferential surface of a holder. The method including wrapping the circumferential surface of the holder with the measuring tape and bracing the measuring tape such that the measuring tape extends spaced apart from the circumference of the holder. When the measuring tape extends spaced from the circumference of the holder due to the bracing, exerting a tensioning force on the measuring tape so that the measuring tape is held with low friction above the circumference, wherein the tensioning force is distributed at least nearly uniformly over the circumference. The method includes undoing the bracing of the measuring tape beginning at a fixation point at which a portion of the measuring tape is affixed to the circumferential surface. The method also includes applying the measuring tape to the circumferential surface of the holder while maintaining the tensioning force.

For installing a measuring tape on a circumferential surface of a holder, the following method step is performed first:

wrapping the circumferential surface of the holder with the measuring tape and bracing the measuring tape such that it extends spaced apart from the circumferential surface of the holder, and exerting a tensioning force on the measuring tape in this state of the measuring tape in which it is held with low friction above the circumference, the tensioning force being distributed at least nearly uniformly over the circumference.

Keeping the measuring tape spaced apart from the circumferential surface of the holder in as friction-free a manner as possible is preferably effected by braces spaced apart from one another in the circumferential direction.

The braces can be positioned on the holder before the measuring tape is wrapped around the circumferential surface. Alternatively, the braces and the measuring tape can be placed around the holder simultaneously. As another possibility, the measuring tape is wrapped around the circumferential surface first and only after that is the friction-free state of the measuring tape created, by lifting it from the circumferential surface.

Once a uniform distribution of tension over the entire length of the measuring tape and, thus, over the wrapped circumference has been attained, the bracing of the measuring tape is undone beginning at a fixation point so that the measuring tape presses against the circumferential surface of the holder while the tensioning force is maintained. This pressing of the measuring tape against the circumferential surface is effected progressively in the circumferential direction.

The fixation point can be formed by fixing the measuring tape on the holder, for instance by one of its ends, and then the tensioning force is applied to the other end of the measuring tape.

Alternatively, a tensioning force can be introduced simultaneously at both ends of the measuring tape, as shown for example in DE 197 51 019 C2. In that case, the fixation point develops in the middle of the circumference wrapped by the measuring tape, and from there, the bracing of the measuring tape must be undone, and the measuring tape is pressed continuously against the circumferential surface.

The tensioning force is a tensile force on the measuring tape, which can be introduced by a weight or a spring.

For creating the spacing of the low-friction support of the measuring tape, the braces advantageously have rollers in the form of guide rollers. Thus, during the tension compensation, only the relatively slight rolling friction of the rollers, against which the measuring tape presses, occurs between the holder and the measuring tape.

So that the tensioning force introduced can be distributed uniformly over the entire length of the measuring tape during the installation, a state is created in which there is low-friction support of the measuring tape relative to the holder. By the provisions according to the present invention, a homogeneous tension state is achieved over the circumference of the measuring tape. Partial slipping of the measuring tape in the circumferential direction (stick-slip effect) during the measurement operation is, thus, largely avoided.

The circumferential surface of the holder on which the measuring tape is installed can extend over 360°, and, thus, over one complete revolution, or over a sector of less than 360°.

Another object of the present invention is to disclose an easily manipulated apparatus for installing a measuring tape on a circumferential surface of a holder. The apparatus includes a means for bracing the measuring tape so that the measuring tape extends spaced apart from the circumferential surface of the holder. The apparatus includes a means for exerting a tensioning force on the measuring tape while the measuring tape extends spaced apart from the circumferential surface of the holder, and wherein the tensioning force is distributed at least nearly uniformly over a circumference of the holder. The apparatus further includes a means for undoing said bracing of the measuring tape so that the measuring tape, beginning at a fixation point, is pressed against the circumferential surface of the holder while the tensioning force is being maintained.

The braces can be a plurality of braces that are shiftable independently of one another, for instance in the form of carriages that are movable in the circumferential direction.

A plurality of braces spaced apart in the circumferential direction can also be coupled to one another by a connection body and can be shifted jointly in the circumferential direction.

The braces can have casters, by which they are guided shiftably in the circumferential direction on the holder, in particular in a slot in the holder.

At least one of the braces can have a magnet. This magnet can be used for maintaining the bracing of the holder by magnetic force. The magnetic maintaining force can be designed to be variable, instance by making the spacing of the magnets from the holder variable.

At least one of the braces can be embodied for varying the spacing between the circumferential surface and the measuring tape. To that end, the brace, for instance, has a pivotable mounting, which on its end has a guide roller that guides the measuring tape.

A structural unit according to the present invention includes a measuring tape to be installed on a circumferential surface of a holder and an apparatus for installing said measuring tape. The apparatus includes a means for bracing the measuring tape so that the measuring tape extends spaced apart from the circumferential surface of the holder. The apparatus includes a means for exerting a tensioning force on the measuring tape while the measuring tape extends spaced apart from the circumferential surface of the holder, and wherein the tensioning force is distributed at least nearly uniformly over a circumference of the holder. The apparatus further includes a means for undoing said bracing of the measuring tape so that the measuring tape, beginning at a fixation point, is pressed against the circumferential surface of the holder while the tensioning force is being maintained.

Further advantages and details of the present invention will become apparent from the ensuing description of exemplary embodiments in conjunction with the drawings.

DETAILED DESCRIPTION OF THE PREFERRED EMBODIMENTS

Figure 1:
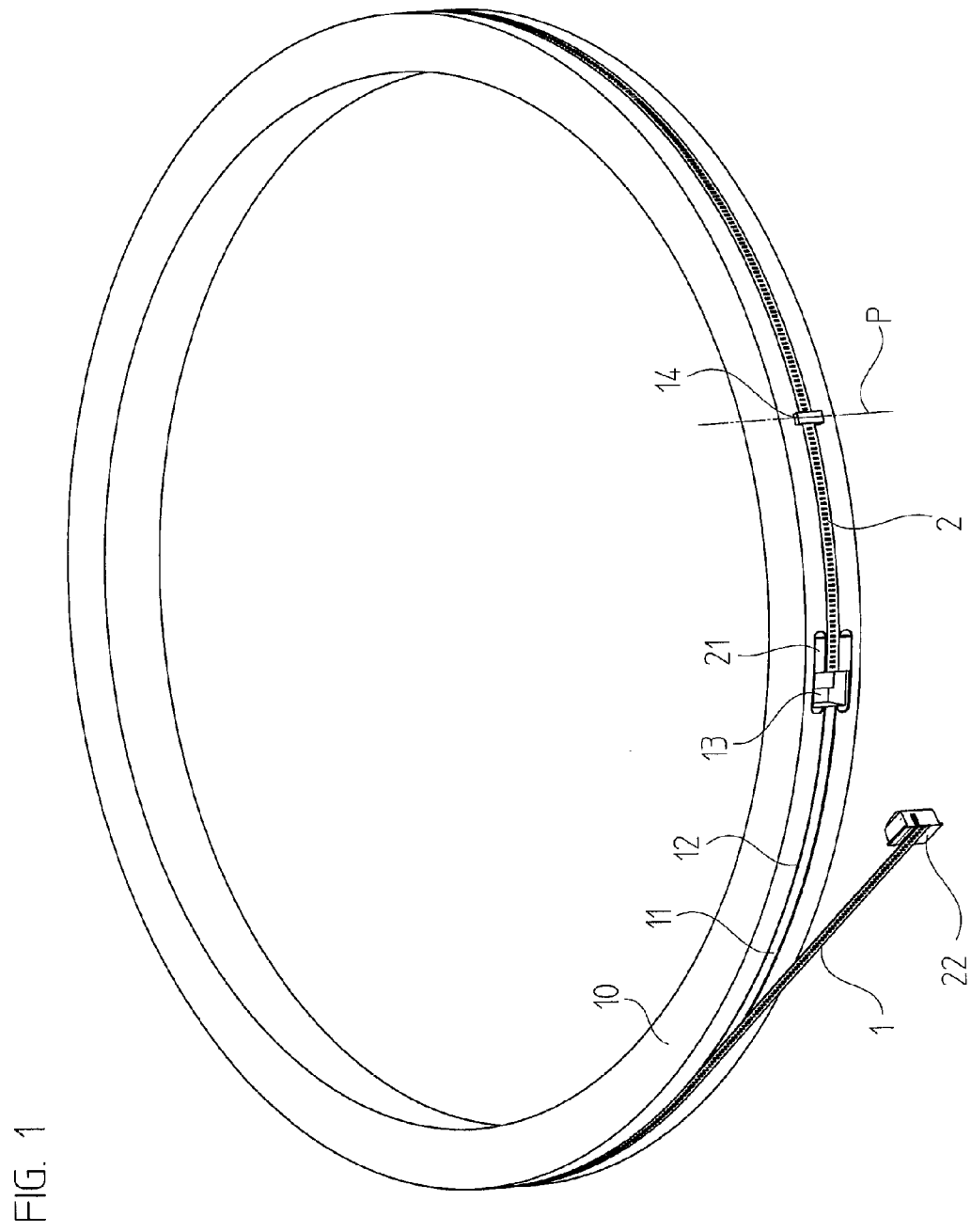
FIG. 1 shows a possible first method step for a possible process for installing a measuring tape on a circumferential surface in accordance with the present invention.

FIGS. 1-11 show a first example of a process for installing a measuring tape 1 on a circumferential surface 11 of a holder 10, which in the exemplary embodiment is a telescope ring structure. The circumferential surface 11 in this example is formed by the bottom of a slot 12 which is made in the holder 10 and extends over a full 360°. The diameter of such a telescope ring structure can amount to several meters.

The measuring tape 1 is a flexible but lengthwise largely stable band, in particular a steel band. On its top side, the measuring tape 1 has a measurement graduation 2, which can be scanned optically. Instead of the optically scannable measurement graduation 2, a measurement graduation that can be scanned magnetically, capacitively, or inductively can also be provided. The measurement graduation can be designed incrementally for relative measurement of an angle position or in encoded form for absolute angle measurement. The measurement graduation can be a single-track or multiple-track measurement graduation.

For installing the measuring tape 1 on the holder 10, in a first step shown in FIG. 1 the measuring tape 1 is wrapped around the circumferential surface 11 of the holder 10. The first end of the measuring tape 1 is connected to a first part 21 of a turnbuckle. This first part 21 of the turnbuckle is inserted into a recess 13 in the holder 10. After that, the measuring tape 1 is placed in the slot 12 over the outer circumference of the holder 10. The first end of the measuring tape 1 is also fixed to the holder 10. This fixation is effected in the example shown in the vicinity of the recess 13 by a clamping piece 14. In a manner not shown, the clamping piece 14 can be omitted if the fixation of the measuring tape 1 to the holder 10 is effected by the first part 21 of the turnbuckle itself, on which the first end of the measuring tape 1 is fastened.

Figure 2:
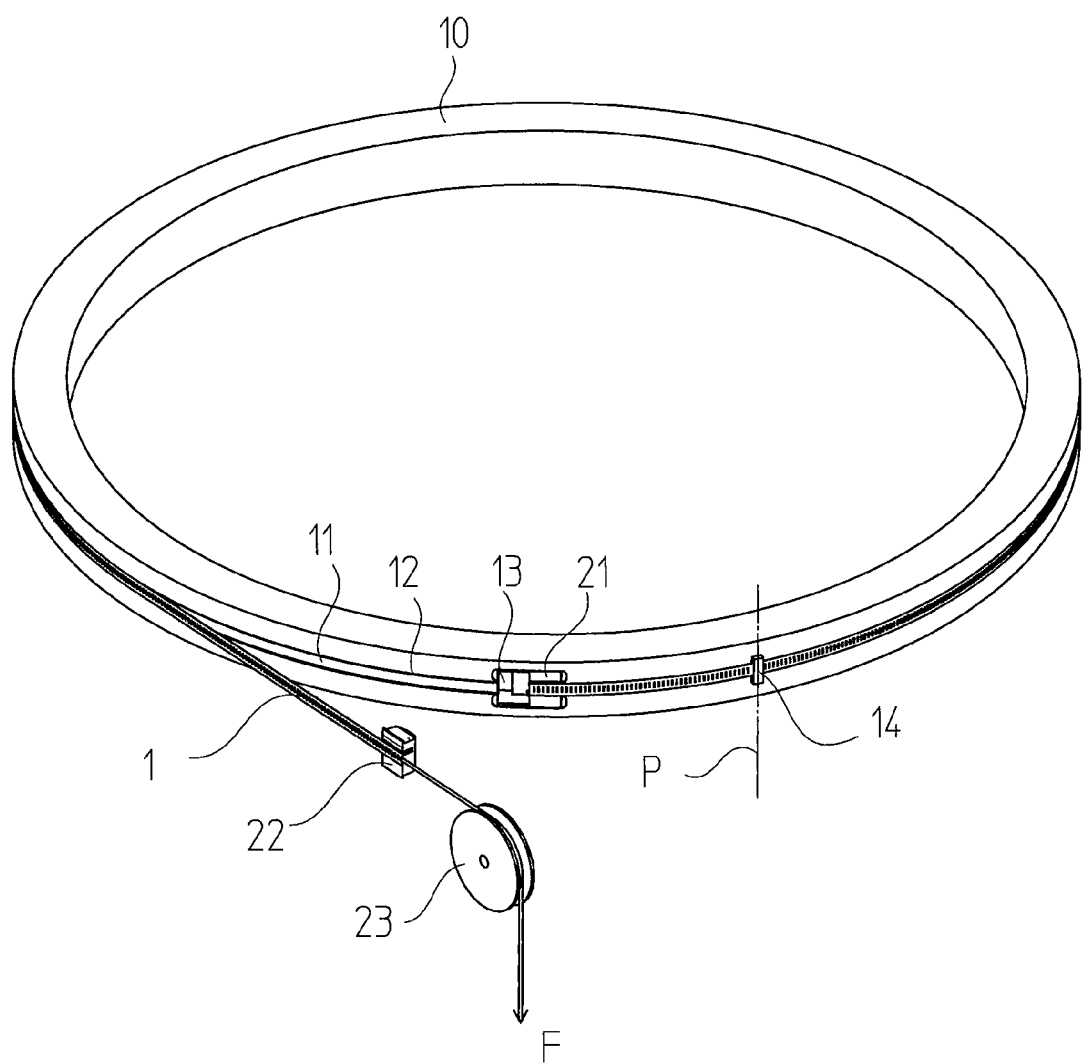
FIG. 2 shows a possible second method step for the possible process of FIG. 1 in accordance with the present invention.

In a second step of the method, a tensioning force F is exerted on the measuring tape 1, as shown in FIG. 2. The tensioning force F is introduced, for example, by attaching a weight via a deflection roller 23, as schematically shown in FIG. 2. The tensioning force F is introduced at the second end of the measuring tape 1, for instance at a second part 22 of the turnbuckle that is fastened to the second end of the measuring tape 1. The measuring tape 1 rests on the circumferential surface 11 of the slot 12 of the holder 10. By static friction between the measuring tape 1 and the circumferential surface 11, the tension of the measuring tape 1 is reduced, beginning at the point of introduction over the circumference, and, thus, extends nonhomogeneously over the circumference. A non-homogeneous distribution of the tension over the wrapped region of the measuring tape can also occur as the result of different coefficients of friction between the circumferential surface 11 and the measuring tape 1.

According to the present invention, a homogeneous tension of the measuring tape 1 is now achieved by supporting the measuring tape 1 with as little friction as possible over the circumference during the installation process. This is achieved by undoing a frictional contact between the measuring tape 1 and the circumferential surface 11, so that the introduced tensioning force F can be distributed uniformly over the circumference, or, in other words, over the entire length of the measuring tape. To that end, in the prestressed state, braces 30 are put in place between the circumferential surface 11 and the measuring tape 1 in such a way that beginning at its first end that is fixed to the holder 10, the measuring tape 1 extends with uniform spacing from the circumferential surface 11 over the entire circumference. This state is shown in FIG. 3.

The braces in the first exemplary embodiment are carriages 30, a plurality of which can be inserted between the circumferential surface 11 of the holder 10 and the tensioned measuring tape 1 and which as a result lift the measuring tape 1 away from the circumferential surface 11. The carriages 30 are designed such that they are guided in the circumferential direction in the slot 12. The construction of such a carriage 30 is shown as an example in FIG. 4. Each carriage 30 accordingly includes two ball-bearing-supported casters 31, which roll in the slot 12 in the holder 10 and are guided there. A further ball-bearing-supported roller serves as a guide roller 32 for guiding the measuring tape 1, which for that purpose has a slot 33 on its outer circumference. The guide roller 32 can be fastened to a pivotable mounting 34, and, as a result, the height of the carriage 30 and, thus, the desired spacing between the circumferential surface 11 of the holder 10 and the measuring tape 1 can be adjusted.

Figure 3:
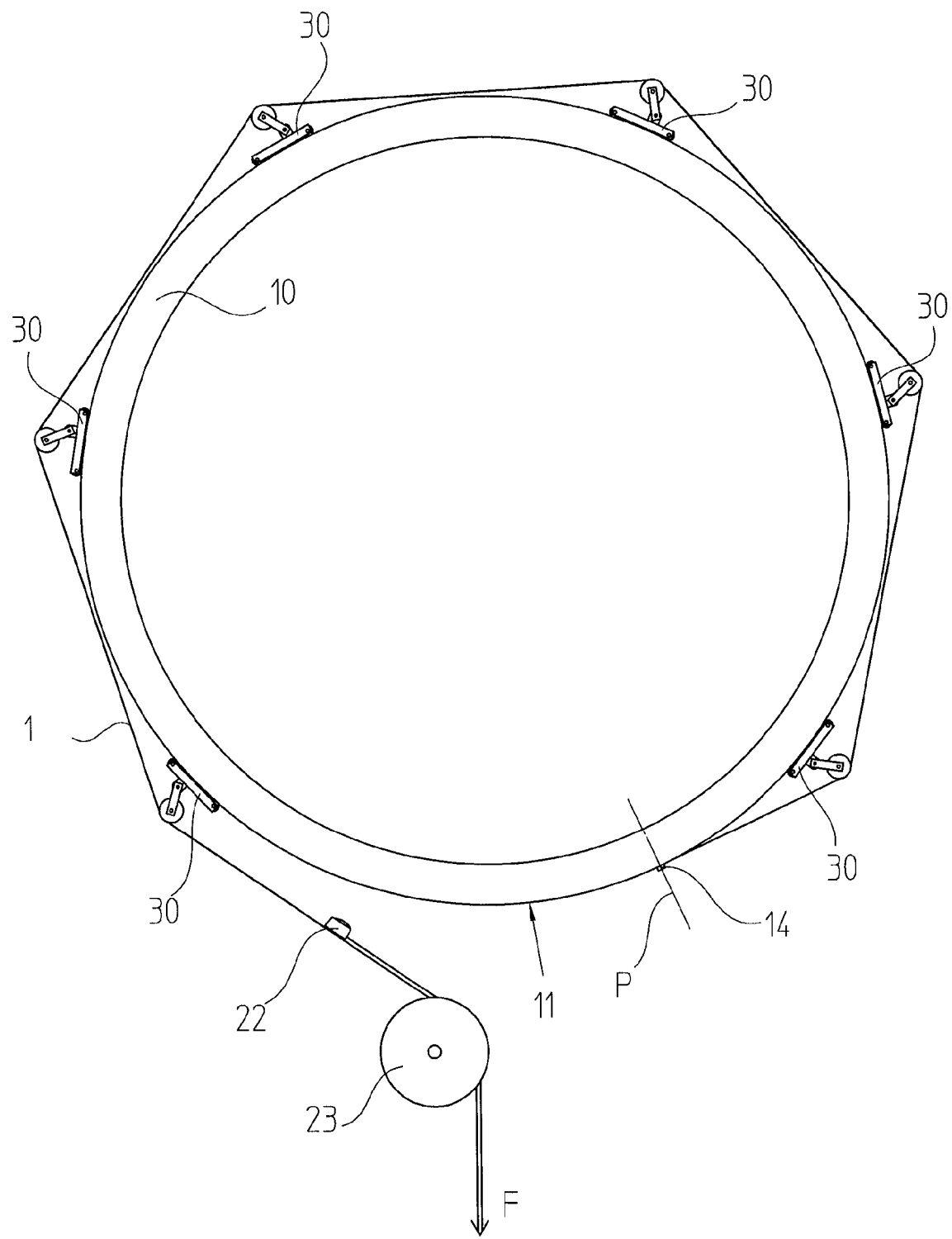
FIG. 3 shows a possible state during the possible process of FIGS. 1-2.
Figure 4:
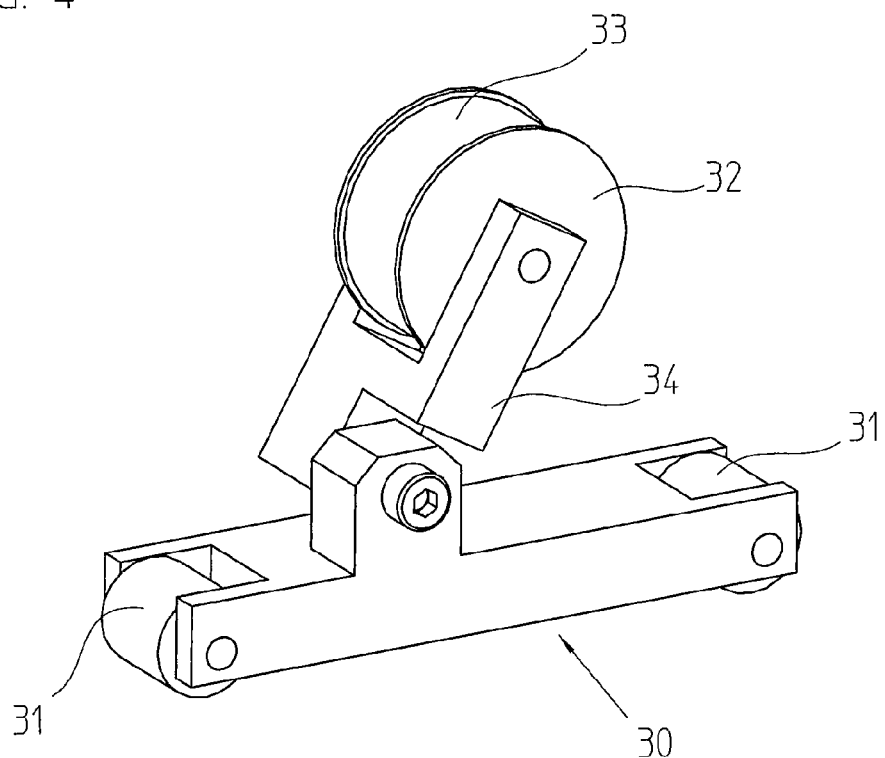
FIG. 4 shows an embodiment of a carriage as a brace to be used with the possible process of FIGS. 1-2 in accordance with the present invention.
Figure 5:
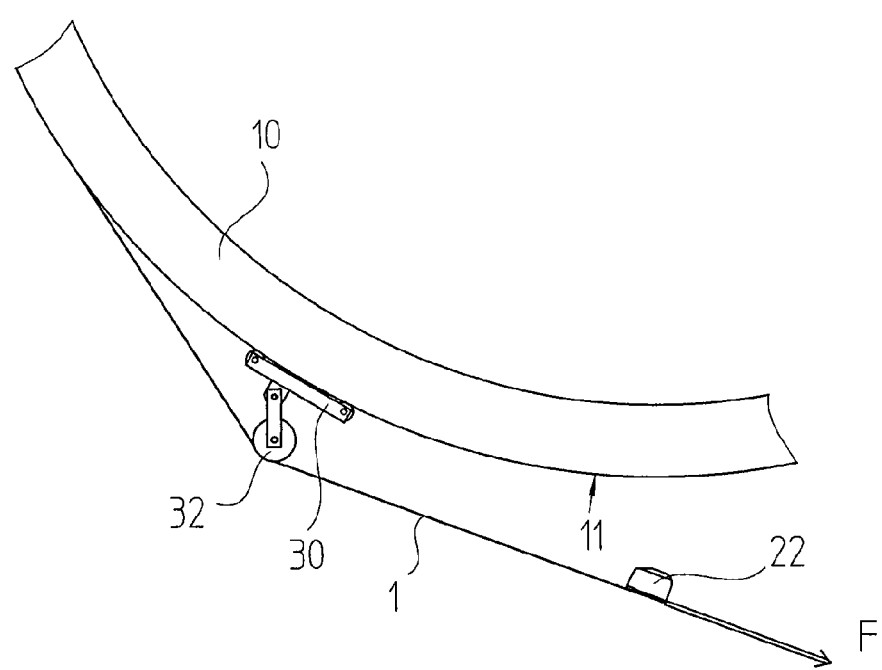
FIG. 5 shows a possible third method step for the process of FIGS. 1-2 with a first position of the carriage of FIG. 4 in accordance with the present invention.
Figure 6:
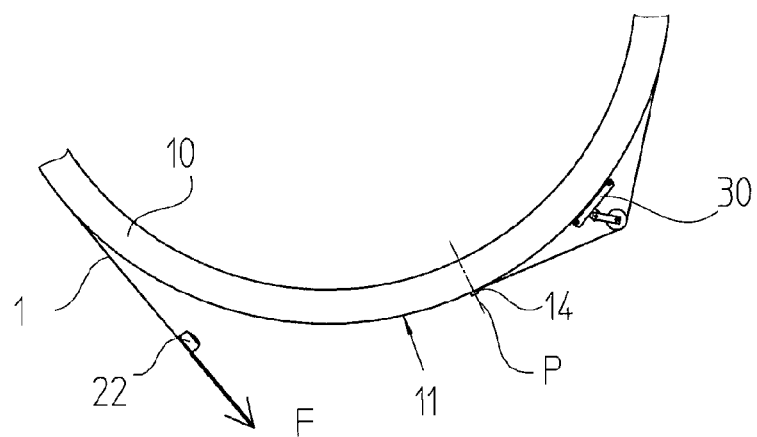
FIG. 6 shows a possible fourth method step for the process of FIGS. 1-2 and 5 with a second position of the carriage of FIG. 4 in accordance with the present invention.

How the state of the measuring tape 1 shown in FIG. 3 is attained will now be described. As shown in FIG. 5, a first carriage 30 is inserted into the slot 12 of the holder 10 and moved in the circumferential direction. If the guide roller 32 of the carriage 30 comes into contact with the measuring tape 1, the latter lifts radially away from the circumferential surface 11. The carriage 30 is then displaced onward in the tangential direction along the circumference, in the direction of the clamping piece 14 fastened to the holder 10, so that the portion of the measuring tape 1 between the fixation point P and the carriage 30 no longer has any contact with the circumferential surface 11. Once this first carriage has reached this terminal position, it is restrained nondisplaceably in this terminal position. This restraint can be done by clamping the casters 31, for which purpose a clamping mechanism is integrated with the carriage 30. The state thus reached is shown in FIG. 6.

After that, the further carriages 30 are inserted between the circumferential surface 11 and the measuring tape 1, until the state shown in FIG. 3 is reached and the measuring tape 1, beginning at the clamping piece 14, is spaced apart from the circumferential surface 11 over the entire circumference. The spacing of the carriages 30 from one another (viewed in the circumferential direction) should be selected such that each portion of the measuring tape 1 located between two carriages 30 is completely lifted up or in other words spaced apart from the circumferential surface 11. The number of carriages 30 required depends on the diameter of the holder 10 and on the circumferential surface 11. As a result of the lifting of the measuring tape 1 from the circumferential surface 11, the introduced tensioning force F now, over the entire circumference, counteracts only the very slight rolling friction of the guide rollers 32 of the carriages 30. Thus the introduced tensioning force F can be distributed largely uniformly over the entire length of the measuring tape 1 from the clamping piece 14, or, in other words, the fixation point P, to the second end.

Figure 7:
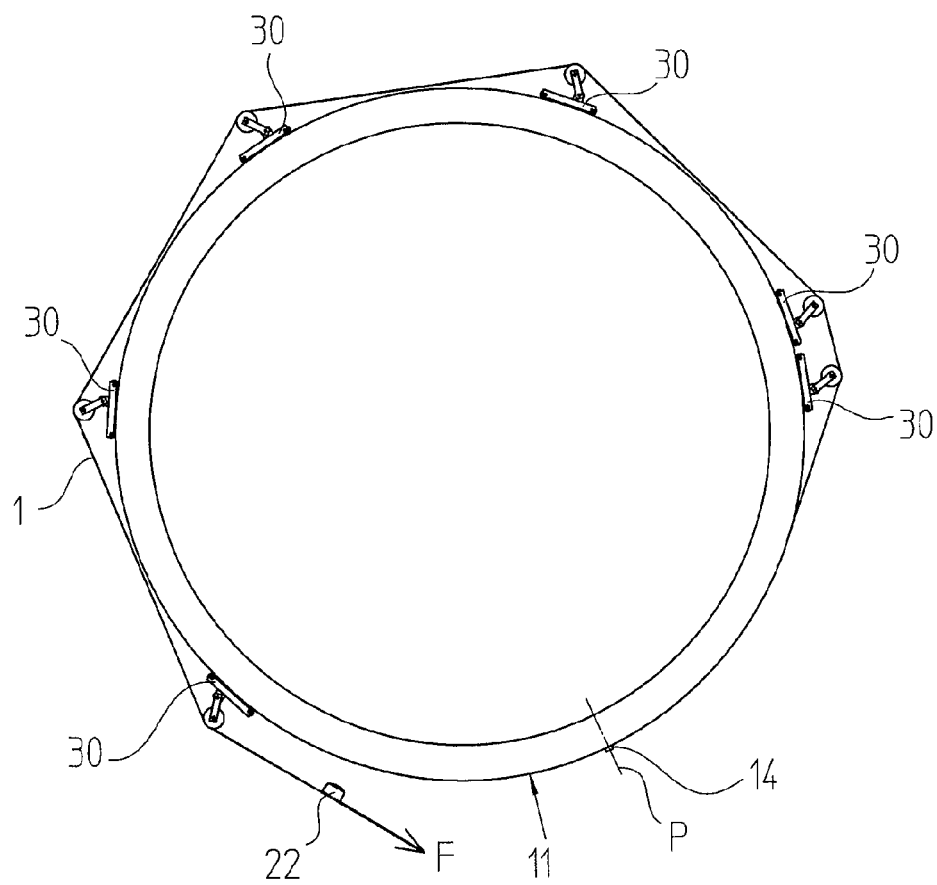
FIG. 7 shows a possible fifth method step for the process of FIGS. 1-2 and 5-6 in accordance with the present invention.

Once all the carriages 30 have been introduced and the tensioning force F has been distributed uniformly over the entire circumference, the process of removing the braces, in this example the carriages 30, can be begun. To that end, the first carriage 30 is displaced in the direction of the second carriage 30, until shortly before reaching the second carriage 30, as shown in FIG. 7. During this displacement of the first carriage 30 in the direction of the second carriage 30, the measuring tape 1 in the tensioned state is pressed tangentially against the circumferential surface 11 of the slot 12.

Figure 8:
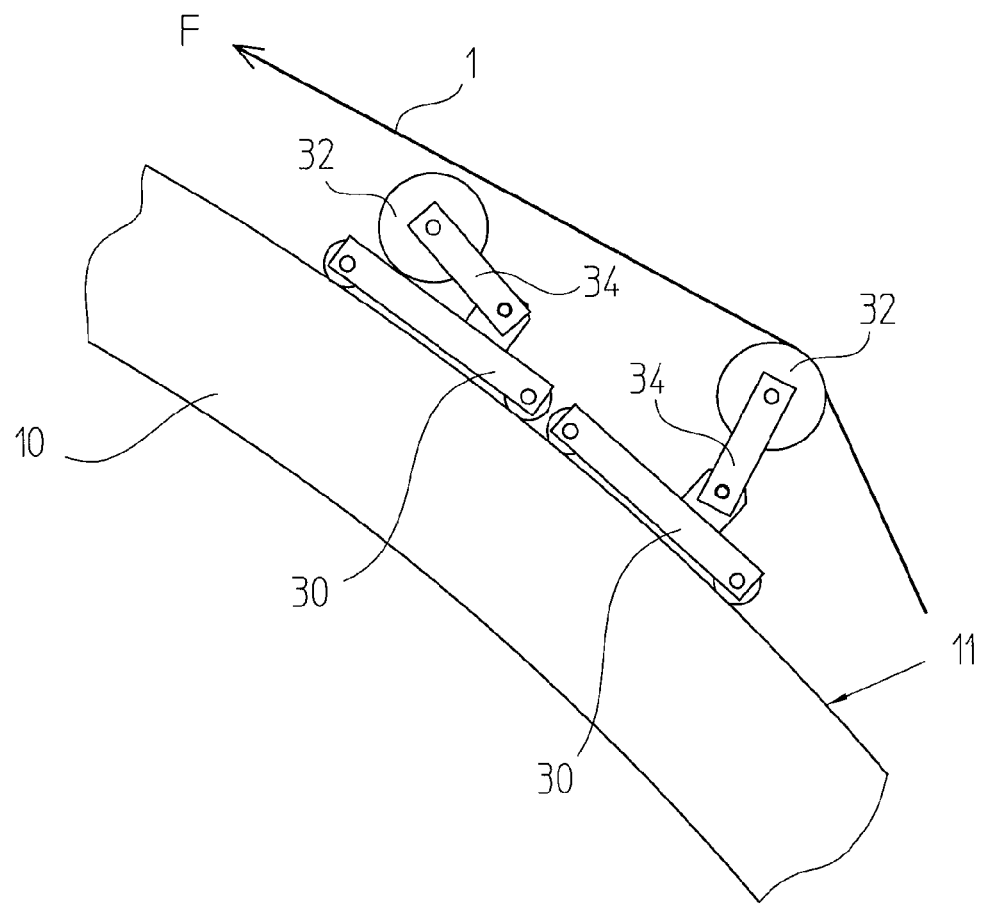
FIG. 8 shows a possible sixth method step for the process of FIGS. 1-2 and 5-7 in accordance with the present invention.

Next, the pivotable mounting 34 of the second carriage 30 is shifted in the direction of the circumferential surface 11 by swiveling it down. By this provision, the contact of the guide roller 32 with the measuring tape 1 is undone, and the second carriage 30 can be removed from the slot 12 of the holder 10. The state in which the guide roller 32 of the second carriage 30 has been swiveled closed is shown in FIG. 8.

An alternative to the mounting 34 that can be swiveled closed is to embody the first carriage 30 with a larger guide roller, such that the diameter of this guide roller is greater than the diameter of the guide rollers of the other carriages 30. The result, in the displacement of the first carriage 30 in the direction of the second carriage 30, is again that the measuring tape 1 is lifted away from the guide roller of the second carriage 30. When the first carriage 30 has been displaced far enough in the direction of the second carriage 30, the contact of the guide roller of the second carriage 30 with the measuring tape 1 is undone, and the second carriage 30 can be removed from the slot 12 of the holder 10.

This procedure is now done repeatedly between the first carriage 30 and the further carriages 30. Thus, the first carriage 30 is now displaced in the direction of the third carriage 30, and the guide roller 32 by pivoting of the lever 34 the contact of the guide roller 32 of the third carriage 30 with the measuring tape 1 is undone. In this state, the third carriage 30 can now be removed from the slot 12 of the holder 10. This removal procedure is repeated until the first carriage 30 has reached the second end of the measuring tape 1 and can be completely removed from the slot 12.

Figure 9:
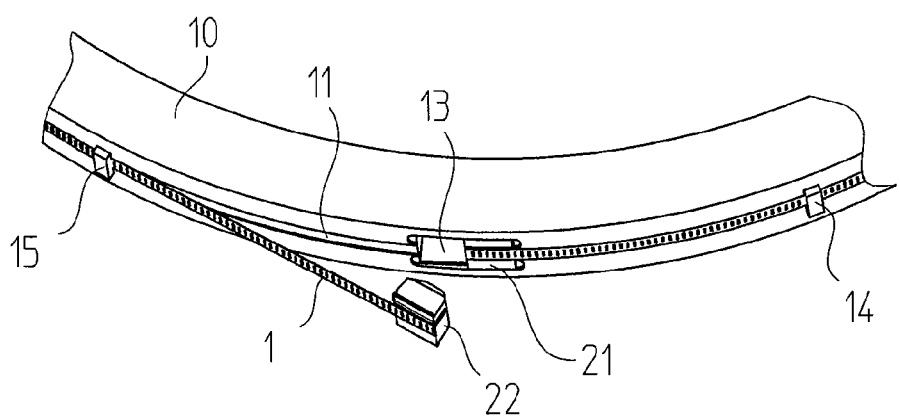
FIG. 9 shows a possible seventh method step for the process of FIGS. 1-2 and 5-8 in accordance with the present invention.

So that the introduced tensioning force F is preserved in the region of the measuring tape 1 that has already been brought into contact with the circumferential surface 11, the measuring tape 1 is fixed in the vicinity of its second end to the holder 10, in this example by a clamping piece 15. This state is shown in FIG. 9.

Figure 10:
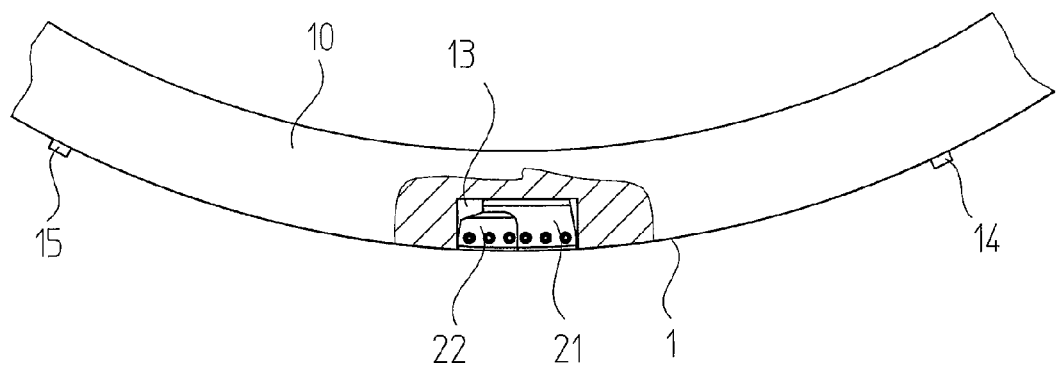
FIG. 10 shows a possible eighth method step for the process of FIGS. 1-2 and 5-9 in accordance with the present invention.
Figure 11:
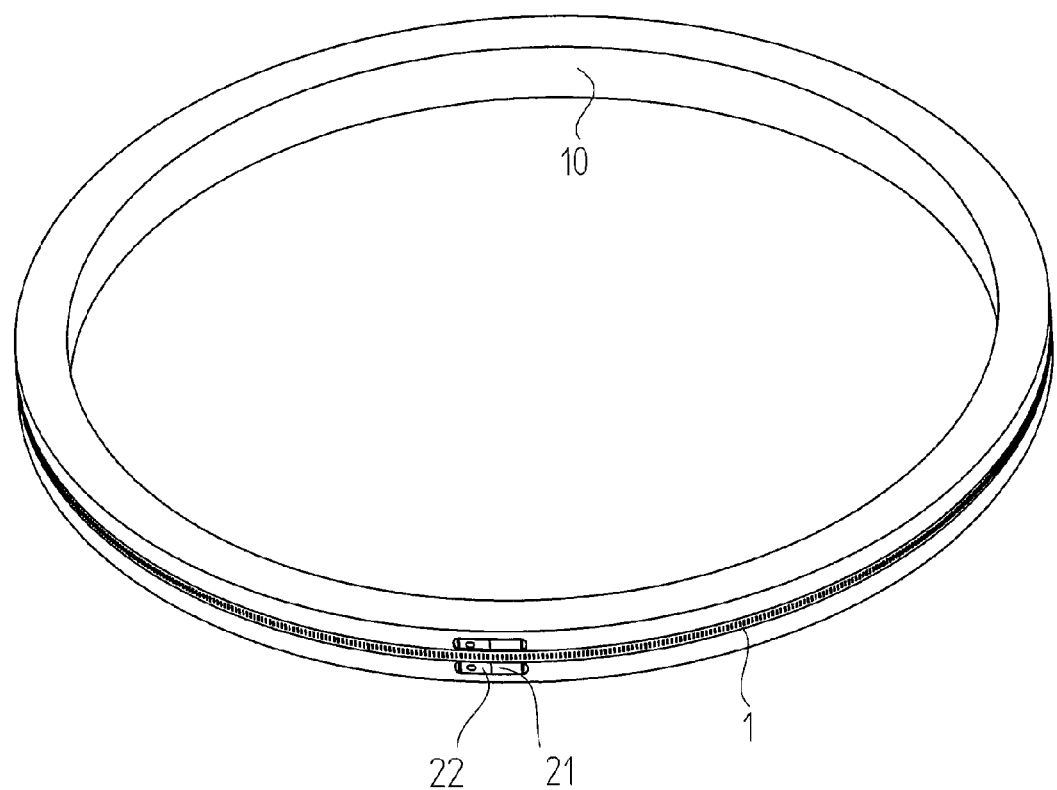
FIG. 11 shows the measuring tape completely installed on the holder using the method of FIGS. 1-2 and 5-9 and the carriage of FIG. 4 in accordance with the present invention.

Now, the device for introducing the tensioning force F is removed so that the second part 22 of the turnbuckle can be placed in the recess 13 in the holder 10 and screwed to the first part 21 of the turnbuckle, as shown in FIG. 10. By this screwing procedure, the still-absent prestressing is introduced into the measuring tape 1 in the region of the turnbuckle 21, 22 between the first clamping piece 14 and the second clamping piece 15. After that, the fixation of the measuring tape 1 to the holder is released, by removing the first clamping piece 14 and the second clamping piece 15. The measuring tape 1 completely installed on the holder 10 is shown in FIG. 11. In this state, the measuring tape 1 rests in tensioned fashion on the entire circumferential surface 11. In this example, the two ends of the measuring tape 1 are connected to one another by the use of the turnbuckle 21, 22; alternatively, still other connectors are conceivable as well, such as welding the two ends together.

After the two ends of the measuring tape have been connected, the measuring tape 1 cannot be fixed to the holder 10 at any point in the measuring mode of operation. Alternatively, to form a reference point, the measuring tape can be fixed to the holder at one point or in one region, for example by clamping or gluing.

The introduced tensioning force F is selected to be so great that even in the event of a difference in thermal expansion between the holder 10 and the measuring tape 1, secure contact of the measuring tape 1 with the holder 10 in the measurement mode of operation is ensured.

The method described in conjunction with FIGS. 1-11 can also be performed with or without the two clamping pieces 14, 15, if the first part 21 of the turnbuckle takes on the function of the first clamping piece 14 and the second part 22 of the turnbuckle takes on the function of the second clamping piece 15.

Figure 12:
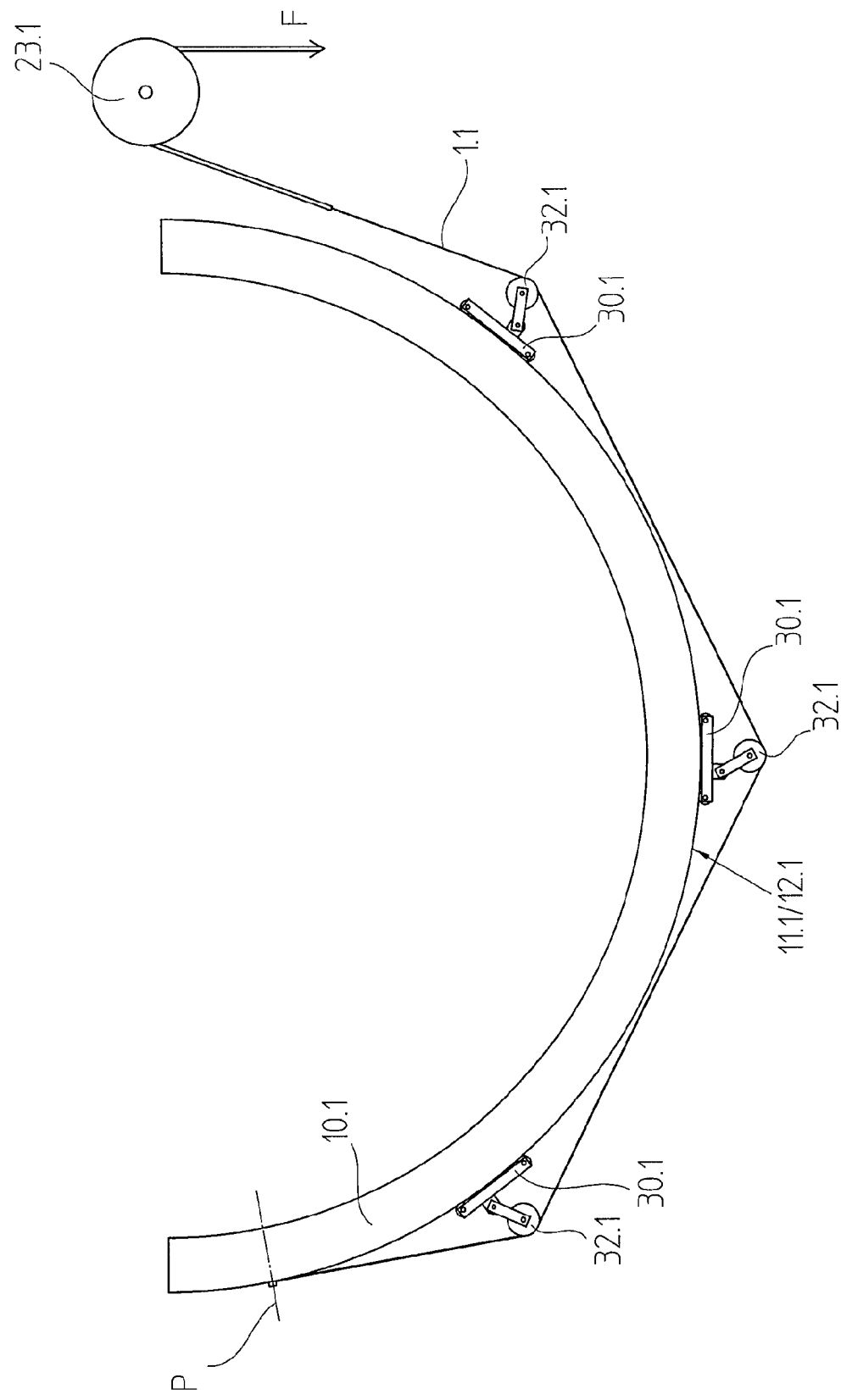
FIG. 12 shows a second exemplary embodiment for installing a measuring tape on a circular arc in accordance with the present invention.

In addition to the installation of the measuring tape 1 over 360°, installation on a circular arc forming the circumferential surface 11.1, such as a segmental holder 10.1, with a circumferential surface 11.1 of less than 360° is also possible. The method steps proceed analogously to the method described first above, and the apparatus for performing the method has a comparable construction, and therefore only a brief explanation of FIG. 12 will be provided. Once again, a holder 10.1 is made available, in which a slot 12.1 extending all the way around the holder is made for receiving the measuring tape 1.1. The holder 10.1 is designed in arc like fashion. The measuring tape 1.1 is again fixed by its first end to the holder 10.1 at the fixation point P, for instance by being screwed to the holder. Via a device that has a deflection roller 23.1, a tensioning force F is exerted on the measuring tape 1.1, and once again braces in the form of carriages 30.1 are introduced between the circumferential surface 11.1 and the measuring tape 1.1, to establish a spacing between the circumferential surface 11.1 and the measuring tape 1.1. Once the compensation for the tensioning force F of the measuring tape 1.1 has been done over the entire segmental holder 10.1, that is, over the entire length of the measuring tape 1.1 beginning at the fixation point P, the carriages 30.1 are again removed in succession until the last carriage 30.1 has also been removed from the slit 12.1. Because of the incremental removal of all the carriages 30, the measuring tape 1.1 in the tensioned state is pressed progressively and tangentially against the circumferential surface 11.1. Once the last carriage 30.1 has been removed, the second end of the measuring tape 1.1 is fixed to the holder 10.1, for instance by clamping with a clamping piece or by being screwed to the holder. The embodiment of the carriages 30.1 is equivalent to that of the carriages in the first exemplary embodiment, so that by the carriages 30.1, the static friction between the circumferential surface 11.1 and the measuring tape 1.1 is undone, and during the state in which the tensioning force F is compensated for over the entire wrap angle, only the extremely slight rolling friction of the guide rollers 32.1 supported in the carriages 30.1 is exerted on the measuring tape 1.1 and counteracts the homogeneous compensation.

Figure 13:
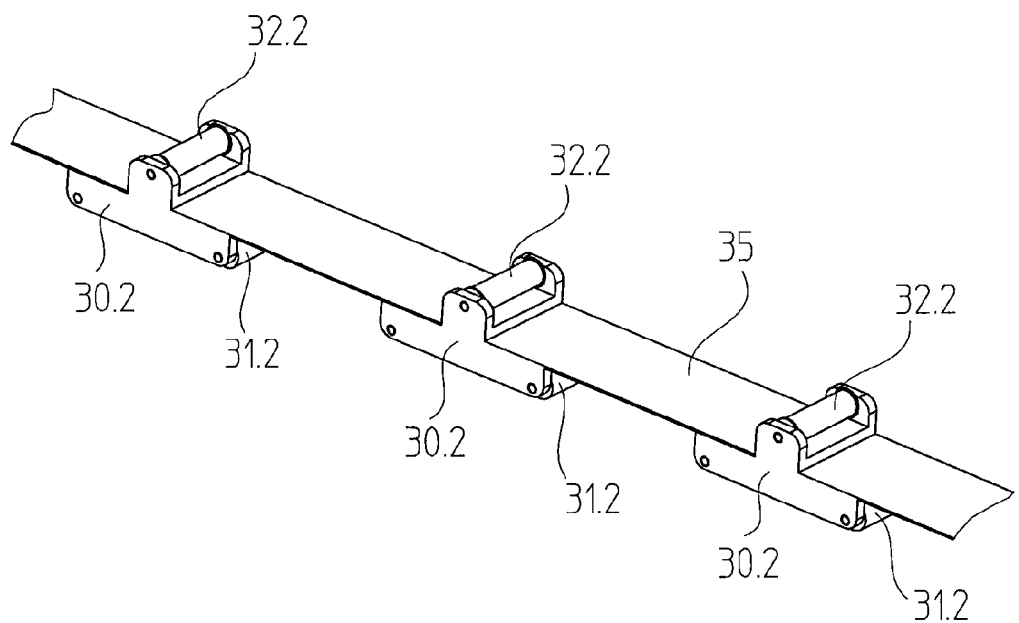
FIG. 13 shows a third exemplary embodiment for installing a measuring tape on a circumferential surface of a holder using braces in accordance with the present invention.

In conjunction with FIGS. 13-16, a third exemplary embodiment will now be described in detail. The difference from the exemplary embodiments described so far is that the individually actuatable bracing elements, in those examples embodied as carriages 30, 30.1, are now connected to one another and form a kind of chain. The carriages 30.2 can then be introduced jointly, in a state in which they are connected to one another, and once the tensioning force F of the measuring tape 1.2 has been compensated for, they can be removed, again jointly. The principle of this arrangement is illustrated in FIG. 13. Each of the carriages 30.2 again includes one guide roller 32.2 for lifting the measuring tape 1.2 in a guided manner and casters 31.2 for guiding the carriages 30.2 in the circumferential direction of the holder 10.2. The carriages 30.2 are connected to one another by a flexible connection body 35. The connection body 35 can be a steel band, for example.

Figure 14:
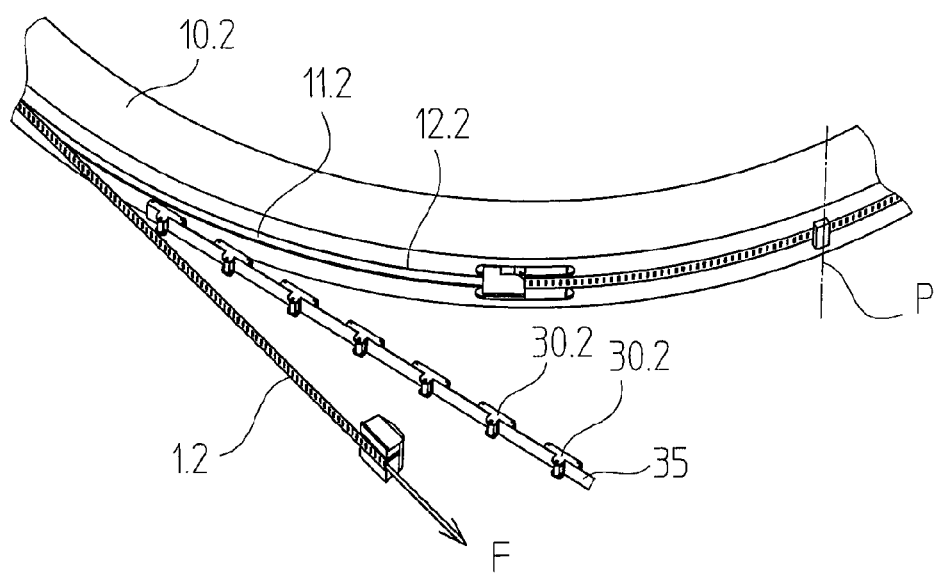
FIG. 14 shows a possible method step for a possible second process for installing a measuring tape with braces of FIG. 13 in accordance with the present invention.
Figure 15:
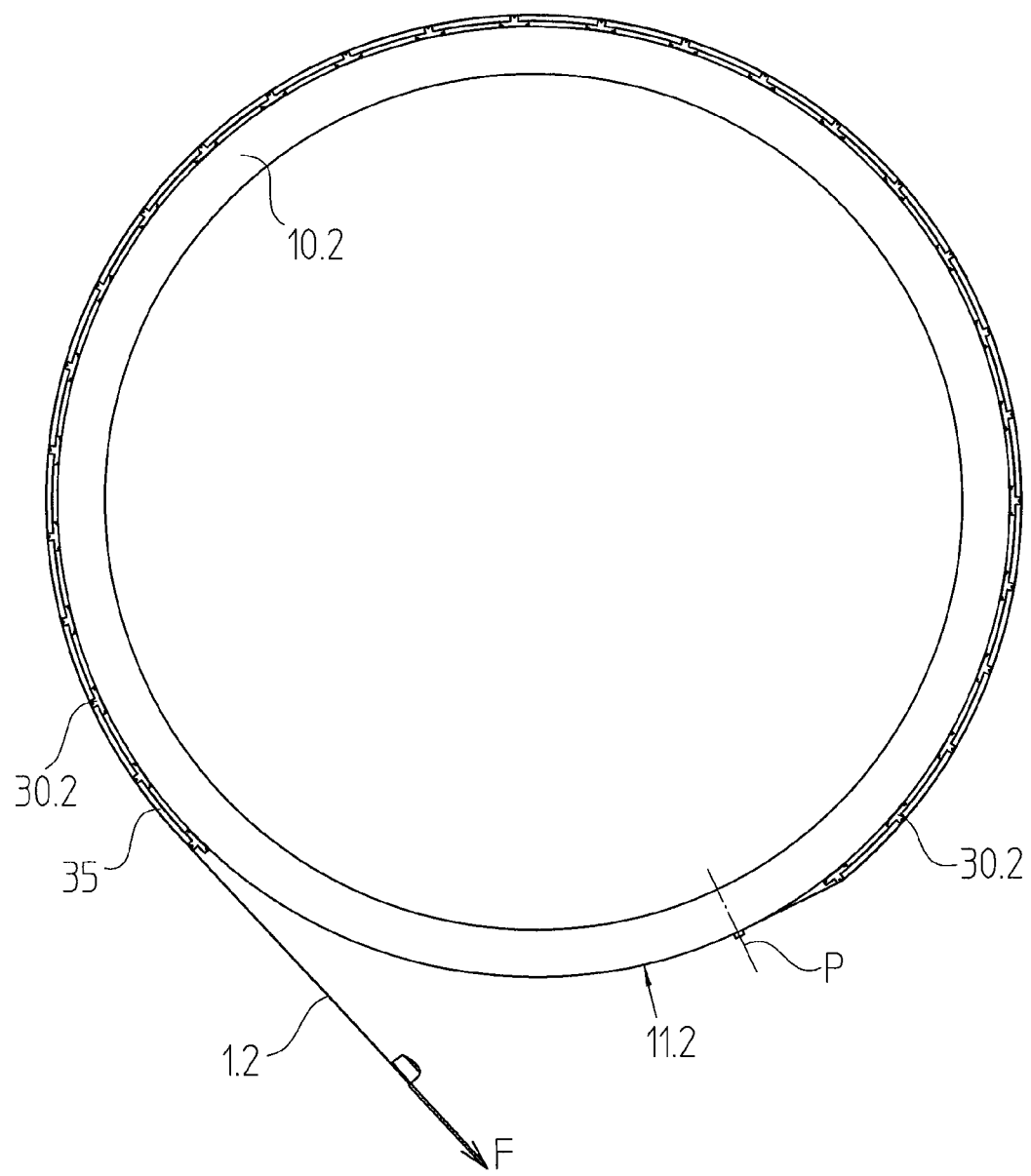
FIG. 15 shows a further possible method step for a possible process for installing a measuring tape with braces of FIG. 13 in accordance with the present invention.

The circumferential surface 11.2 of the holder 10.2 is again wrapped with the measuring tape 1.2, and a tensioning force F is exerted on at least one end of the measuring tape. The measuring tape 1.2 can again rest in a slot 12.2 of the holder 10.2, and the circumferential surface 11.2 is then formed by the bottom of the slot 12.2. In this state, the joined-together carriages 30.2 are inserted between the holder 10.2 and the measuring tape 1.2, as shown in FIG. 14. The disposition of the braces in the form of joined-together carriages 30.2 is designed such that in the inserted state, the measuring tape 1.2 is lifted, beginning at the first end fixed to the holder, from the circumferential surface 11.2 over the entire circumference (wrap angle) and, thus, is supported with as little friction as possible, and the applied tensioning force F is distributed over the entire length of the measuring tape. This state is shown in FIG. 15.

Once the tension has been compensated for, the joined-together carriages 30.2 are removed, and, thus, beginning at the fixation point P the bracing of the measuring tape 1.2 is undone, so that beginning at the first fixed end of the measuring tape 1.2, that is, the tensioning point P, the measuring tape 1.2 is pressed tangentially against the circumferential surface 11.2. The fixation point P is preserved.

In the event of large measuring tape lengths, the bracing of the measuring tape 1.2 can also include a plurality of chains, each chain having a plurality of carriages 30.2 joined together each via a respective connection body. In that case, these chains each include a plurality of carriages 30.2 that are inserted in succession between the circumferential surface 11.2 and the measuring tape 1.2.

Figure 16:
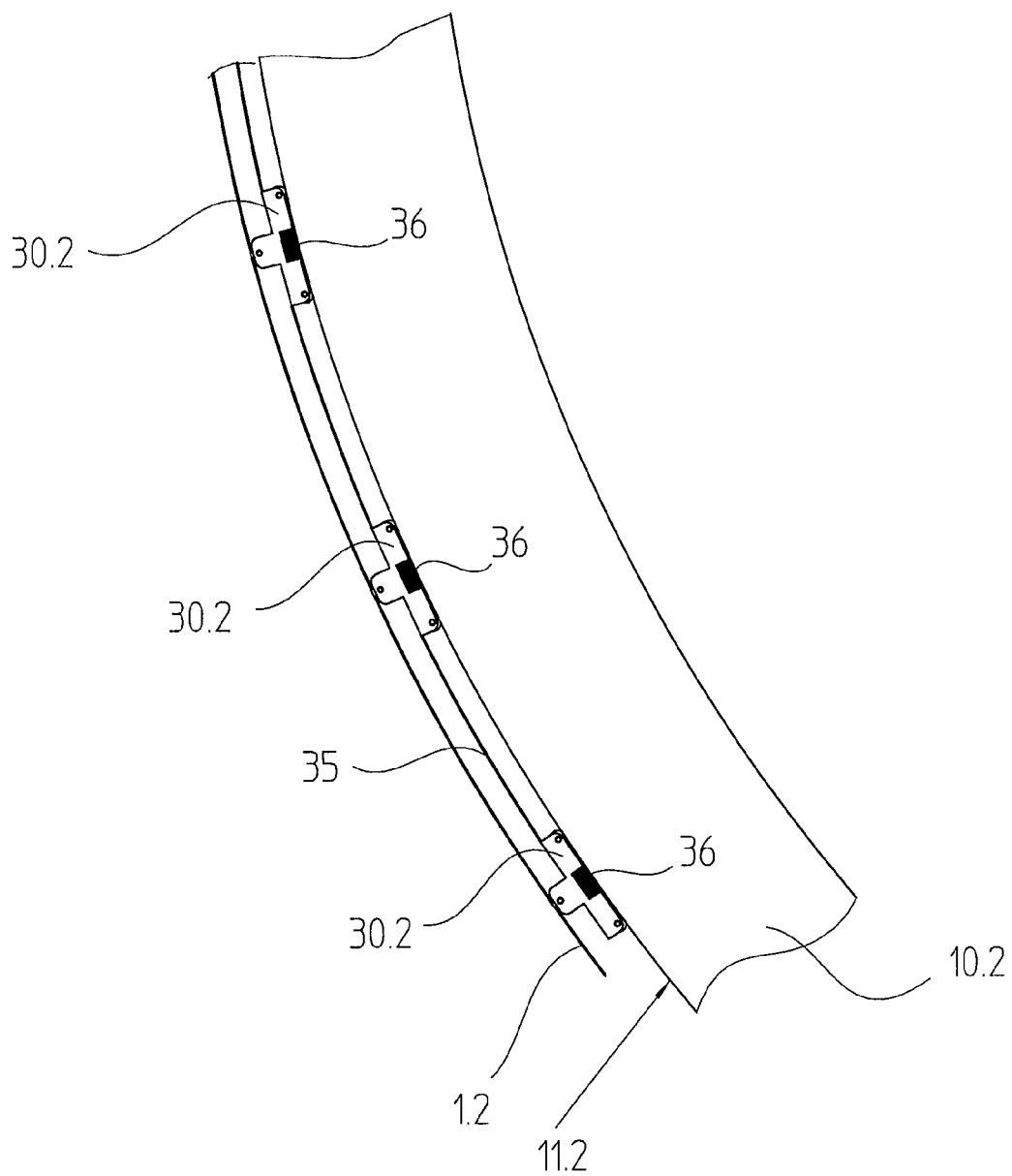
FIG. 16 shows a second embodiment of the braces of FIG. 13 in accordance with the present invention.

As shown schematically in FIG. 16, the carriages 30.2 can have magnets 36, which ensure that the carriages 30.2 rest well on the circumferential surface 11.2 without falling out. To that end, the magnets 36 are opposite the circumferential surface 11.2 of the holder 202 and spaced slightly apart from the holder. In this case, the holder 10.2 must accordingly either include a ferromagnetic material or at least have a ferromagnetic material in the vicinity of the magnets 36.

In all the exemplary embodiments, the braces, or at least one of the braces, can be provided with a kind of brake, in order to fix the brace to the holder at a desired position on the circumference. This kind of brake can be implemented, for instance, by making the braces capable of being clamped locally to the holder, for which purpose a clamping mechanism is provided for the clamping.

In the examples of the methods described thus far, the first step is wrapping the holder 10, 10.1, 10.2 with the measuring tape 1, 1.1, 1.2, and only after that are the braces introduced, for instance in the form of the carriages 30, 30.1, 30.2. It is alternatively possible first to dispose the braces and only then in a subsequent step to place the measuring tape on the braces and after that to exert the tensioning force F on the measuring tape. The measuring tape and the braces can also be applied jointly, or, in other words, installed simultaneously.

Instead of the carriages 30, 30.1, 30.2 that are displaceable over the circumference of the holder 10, 10.1, 102, elements can also be attached that are fastened to the holder 10, 10.1, 10.2 and that allow localized lifting up of the measuring tape 1, 1.1, 1.2 for the period of time of the homogeneous compensation for the tensioning force F of the measuring tape 1, 1.1, 1.2.

The foregoing description is provided to illustrate the present invention, and is not to be construed as a limitation. Numerous additions, substitutions and other changes can be made to the present invention without departing from its scope as set forth in the appended claims.

We claim:

1. A method for installing a measuring tape on a circumferential surface of a holder, the method comprising:
    wrapping said circumferential surface of said holder with said measuring tape;
    bracing said measuring tape such that said measuring tape extends spaced apart from said circumference of said holder;
    when said measuring tape extends spaced from said circumference of said holder due to said bracing, exerting a tensioning force on said measuring tape so that said measuring tape is held with low friction above said circumference, wherein said tensioning force is distributed at least nearly uniformly over said circumference;
    undoing said bracing of said measuring tape beginning at a fixation point at which a portion of said measuring tape is affixed to said circumferential surface; and
    applying said measuring tape to said circumferential surface of said holder while maintaining said tensioning force.

2. The method according to claim 1, wherein during said tensioning force being distributed nearly uniformly over said circumference, said measuring tape is kept spaced apart from said circumferential surface of said holder by braces spaced apart from one another in a circumferential direction.

3. The method according to claim 2, wherein during said tensioning force being distributed nearly uniformly over said circumference, said measuring tape rests on guide rollers of said braces.

4. The method according to claim 2, wherein said undoing of said bracing of said measuring tape is effected by displacing said braces in a slot that extends in a longitudinal direction in said holder.

5. An apparatus for installing a measuring tape on a circumferential surface of a holder, the apparatus comprising:
    means for bracing said measuring tape so that said measuring tape extends spaced apart from said circumferential surface of said holder;
    means for exerting a tensioning force on said measuring tape while said measuring tape extends spaced apart from said circumferential surface of said holder, and wherein said tensioning force is distributed at least nearly uniformly over a circumference of said holder; and
    means for undoing said bracing of said measuring tape so that said measuring tape, beginning at a fixation point, is pressed against said circumferential surface of said holder while said tensioning force is being maintained.

6. The apparatus according to claim 5, wherein said means for bracing comprises a plurality of braces disposed spaced apart from one another in a circumferential direction, which braces are embodied for keeping said measuring tape spaced apart from said circumference of said holder while said tensioning force is being compensated for.

7. The apparatus according to claim 6, wherein each of said plurality of braces comprises a rotatably supported guide roller on which said measuring tape rests.

8. The apparatus according to claim 6, wherein said plurality of braces are shiftable in said circumferential direction independently of one another.

9. The apparatus according to claim 7, wherein said plurality of braces are shiftable in said circumferential direction independently of one another.

10. The apparatus according to claim 6, wherein said plurality of braces are coupled to one another by a connection body and are shiftable jointly in said circumferential direction.

11. The apparatus according to claim 7, wherein said plurality of braces are coupled to one another by a connection body and are shiftable jointly in said circumferential direction.

12. The apparatus according to claim 6, wherein each of said plurality of braces comprises casters that are guided shiftably in said circumferential direction on said holder.

13. The apparatus according to claim 6, wherein one of said plurality of braces comprises a magnet.

14. The apparatus according to claim 6, wherein one of said plurality of braces has a structure for varying a spacing between said plurality of braces and said measuring tape.

15. A structural unit, comprising:
    a measuring tape to be installed on a circumferential surface of a holder; and
    an apparatus for installing said measuring tape, said apparatus comprising:
        means for bracing said measuring tape so that said measuring tape extends spaced apart from said circumferential surface of said holder;
        means for exerting a tensioning force on said measuring tape while said measuring tape extends spaced apart from said circumferential surface of said holder, and wherein said tensioning force is distributed at least nearly uniformly over a circumference of said holder; and
        means for undoing said bracing of said measuring tape so that said measuring tape, beginning at a fixation point, is pressed against said circumferential surface of said holder while said tensioning force is being maintained.

16. The structural unit according to claim 15, wherein said means for bracing comprises a plurality of braces disposed spaced apart from one another in a circumferential direction, which braces are embodied for keeping said measuring tape spaced apart from said circumference of said holder while said tensioning force is being compensated for.

17. The structural unit according to claim 16, wherein each of said plurality of braces comprises a rotatably supported guide roller on which said measuring tape rests.

18. The structural unit according to claim 16, wherein said plurality of braces are shiftable in said circumferential direction independently of one another.

19. The structural unit according to claim 17, wherein said plurality of braces are shiftable in said circumferential direction independently of one another.

20. The structural unit according to claim 16, wherein said plurality of braces are coupled to one another by a connection body and are shiftable jointly in said circumferential direction.

21. The structural unit according to claim 17, wherein said plurality of braces are coupled to one another by a connection body and are shiftable jointly in said circumferential direction.

22. The structural unit according to claim 16, wherein each of said plurality of braces comprises casters that are guided shiftably in said circumferential direction on said holder.

23. The structural unit according to claim 16, wherein one of said plurality of braces comprises a magnet.

24. The structural unit according to claim 16, wherein one of said plurality of braces has a structure for varying a spacing between said plurality of braces and said measuring tape.

\* \* \* \* \*